March 4, 1947.　　　　　J. SPIEGEL　　　　　2,416,961
LANDING STABILIZER FOR AIRCRAFT
Filed Sept. 25, 1945　　　　5 Sheets-Sheet 4

INVENTOR.
Jacob Spiegel
BY
Leonard L. Kalish
Attorney

Patented Mar. 4, 1947

2,416,961

UNITED STATES PATENT OFFICE 2,416,961

LANDING STABILIZER FOR AIRCRAFT

Jacob Spiegel, Philadelphia, Pa.

Application September 25, 1945, Serial No. 618,456

10 Claims. (Cl. 244—93)

The present invention relates to certain new and useful improvements in aircraft and it relates more particularly to novel stabilizing means for use during landing of fixed-wing heavier-than-air craft.

The operation of fixed-wing heavier-than-air craft presents certain difficulties which tend to limit the usefulness thereof. Fixed-wing heavier-than-air craft, as is well known, are sustained in flight by the differential pressure above and below the wings thereof; such pressure, in turn, being created by the forward movement of the aircraft. Thus, the aircraft must, at all times, maintain a minimum forward speed in order to keep it responsive to the controls and to sustain it in flight. This minimum forward speed varies, of course, with the size and type of the aircraft but, in all cases, is appreciable; even the lightest and smallest of aircraft having a minimum operating speed of approximately 60 miles per hour.

It is apparent, therefore, that a fixed-wing heavier-than-air craft must land at a considerable speed ranging from 40 miles per hour upward, even where wing flaps are used. Present-type fixed-wing aircraft, when landing at this speed, necessarily require a run of at least several hundred feet before they can be halted safely. In present-type fixed-wing aircraft it is impractical to attempt to reduce this run by braking the wheels since the forward momentum of the craft would cause it to nose over or to "ground-loop" with the resultant danger to the aircraft and to the pilot and other occupants thereof.

In my co-pending application Serial No. 438,375, filed April 10, 1942, now Patent No. 2,385,-850, issued October 2, 1945, which contains subject-matter common with that of the present application, I have disclosed a stabilizing means for landing a fixed-wing aircraft within a relatively short distance. The stabilizing means of my application Serial No. 438,375 comprises one or more weights slidably mounted within the fuselage of the aircraft and normally carried at the center-of-gravity of the aircraft and releaseable during the landing glide of the aircraft so as to be transferred, by gravity, along a track to the tail of the aircraft; this weight-transfer causing the aircraft to become tail-heavy and permitting the elevators to be depressed and to act as landing flaps thereby further to reduce the landing speed (the released weight in the tail of the plane serving to counteract the normal tendency of the lowered elevators to raise the tail of the plane). At the same time, the weight in the tail of the plane permits the brakes to be applied as soon as the aircraft wheels strike the ground, without the tendency of "nosing over" which would otherwise result.

An object of the present invention is to provide a new and improved form of landing stabilizer of the general character disclosed in my copending application Serial No. 438,375. More specifically, an object of the present invention is to provide a landing stabilizer of simplified construction and more positive action wherein a weight (or a plurality of weights) is slidably mounted upon a track within the fuselage of a fixed-wing aircraft; the weight being normally retained at approximately the center-of-gravity of the aircraft and being provided with pilot-operable release mechanism which will permit quick and positive transfer of the weight from its normal forward position to a position generally within the tail of the plane; means being provided at the rear end of the track for absorbing the shock of the weight during the transfer and improved means being provided for automatically locking the weight in the rearmost position. Another object of the present invention is to provide improved mechanism for releasing the automatic mechanism at the rear of the track and means for returning the weight to its forward position after a landing has been completed.

Other objects and advantages of the present invention are apparent in the following detailed description, appended claims and accompanying drawings.

For the purpose of illustrating the invention there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout.

Figure 1:
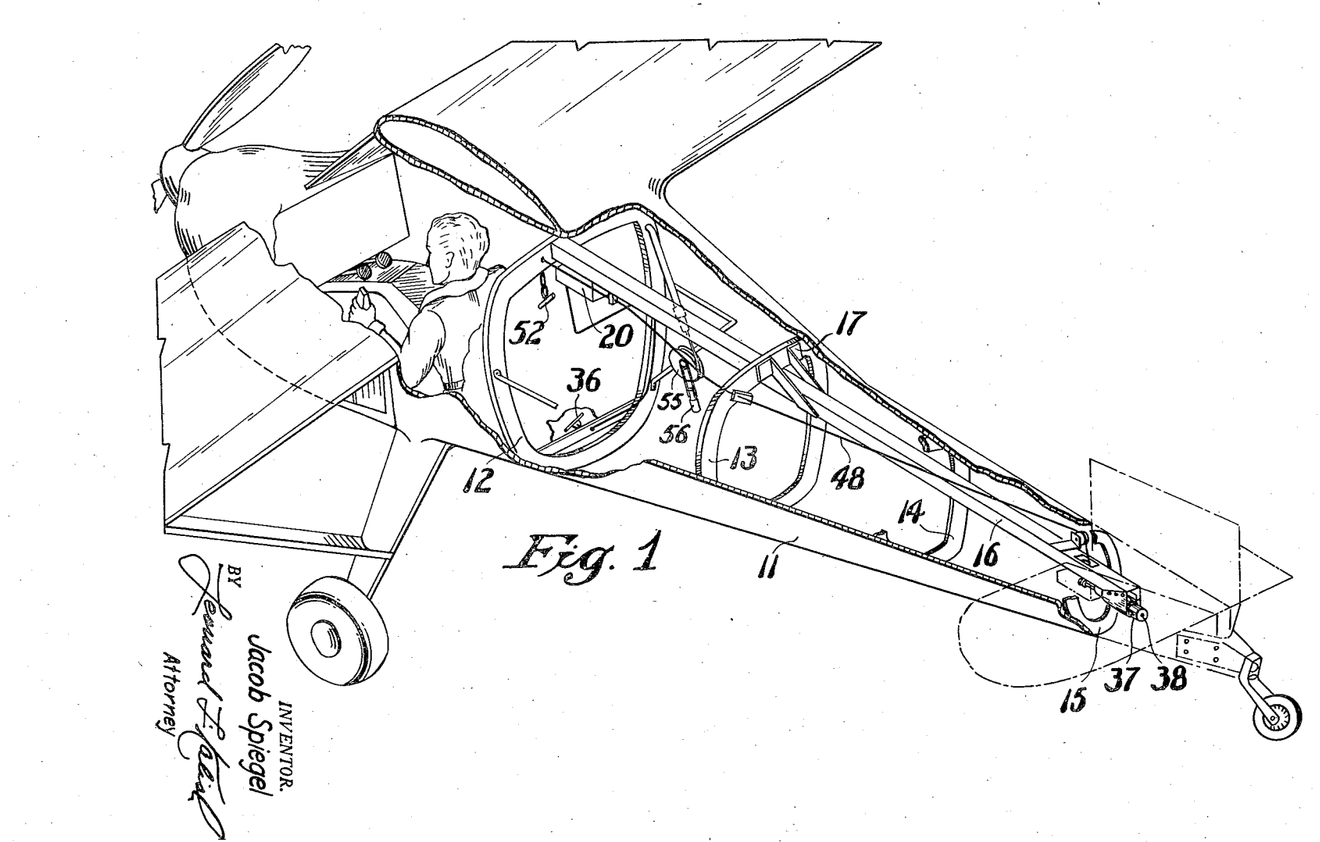
Figure 1 represents a fragmentary perspective view of an aircraft equipped with the novel landing stabilizer of the present invention; parts being broken away better to reveal the construction thereof.

In one embodiment of the present invention shown generally in Figures 1 to 8, I may employ my novel landing stabilizer with a fixed-wing aircraft of the type shown generally in Figure 1; that is, a traction-type high-wing monoplane of generally conventional construction having a fuselage 11 in which are disposed a front rib or bulkhead 12, intermediate ribs 13 and 14 and a rear rib 15. The ribs 12, 13, 14 and 15 conform to the rearwardly-tapered fuselage section; the front rib 12 being the largest while the rear rib 15 is the smallest.

The traction propeller of the aircraft is of conventional construction and is driven by a conventional power-plant (not shown) installed in the nose of the plane, in front of the cockpit.

The aircraft is provided with a braking system of conventional construction (not shown) whereby the wheels may be braked upon landing to give a short run and a quick stop.

Within the fuselage 11 I may provide a rearwardly sloping track 16 which may be affixed to the ribs 12—15 in any conventional manner; as for example by brackets 17 fastened to the tops of the ribs and to the sides of the track.

Figures 6, 7:
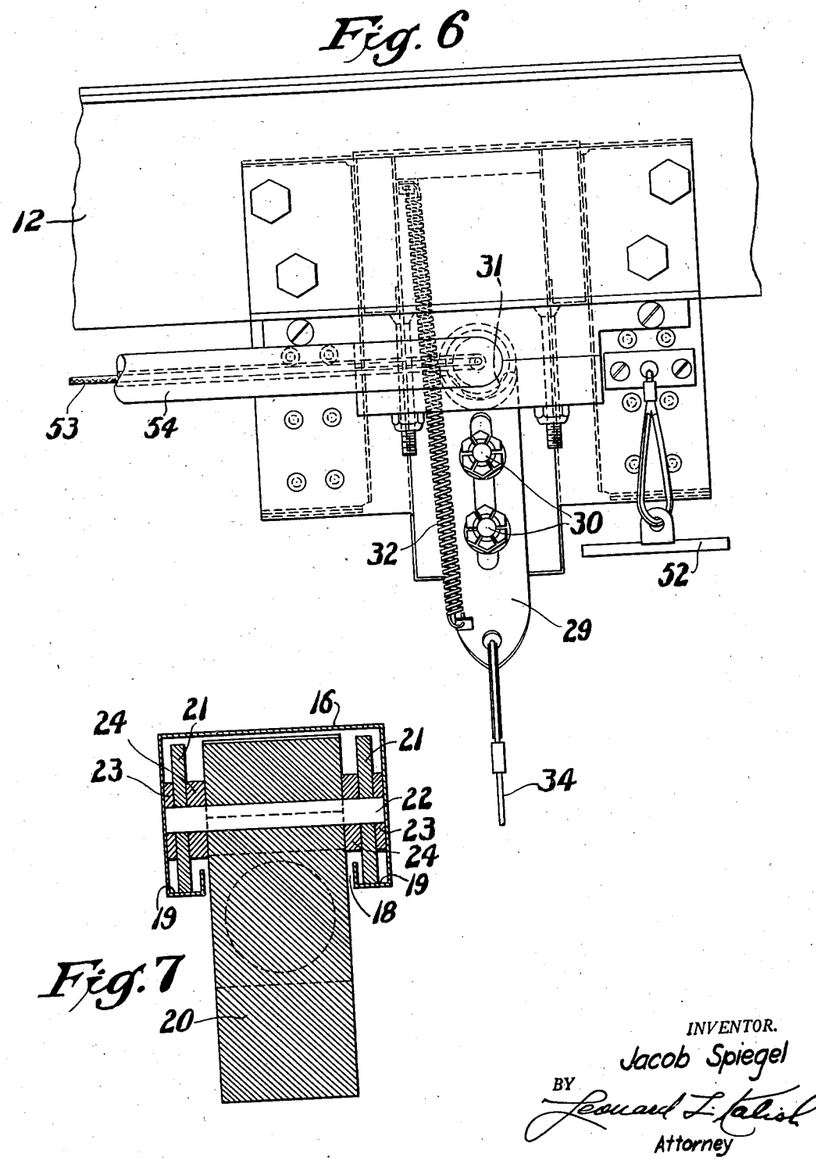
Figure 6 represents a front elevational view of the front end of the track showing the locking and release mechanism.
Figure 7 represents a cross-sectional view of the weight and track taken generally along the line 7—7 of Figure 5.

The track 16, which may be of sheet metal or the like, is of the enclosed type having a central bottom opening or slot 18 and a pair of races 19 disposed on either side of the slot 18, as shown particularly in Figure 7.

A weight 20 is movably mounted within the track 16; the upper part of said weight 20 fitting within the track and being carried by four rollers 21 rotatably mounted upon a pair of shafts 22 extending through the weight 20 and having generally the same transverse dimension as the track 16. Outer and inner spacer washers 23 and 24 are mounted upon the protruding ends of the shafts 22 on either side of the rollers 21; the washers 23 and 24 serving to prevent lateral shifting of the weight 20 relative to the track 16.

As can be seen particularly in Figure 7, the rollers 21 fit within the races 19 of the track 16 and permit the weight 20 to move freely along said track.

The weight 20, which is preferably of lead, is provided with a transversely-extending plug 57 of steel or other material sufficiently hard to be screw-threaded. An elongated reduced nose-piece 25 of steel or the like, having a rounded front end, extends into the weight 20 and is screw threadedly connected, as at 58, to the steel insert 57. The forward protruding portion of the nose-piece 25 is provided with an annular locking groove 26.

A funnel-shaped member 27 is mounted below the upper forward end of the track 16, as shown particularly in Figures 4 and 5, and is adapted to receive the nose-piece 25 in the manner shown in Figure 5. When the nose-piece 25 is within the member 27, the groove 26 of the nose-piece 25 coincides with a slot 28 formed in the member 27.

A slotted locking plate 29 is slidably mounted upon a pair of bolts 30 and is in alignment with the slot 28. The upper end of the locking plate 29 is provided with a semi-circular notch 31.

A helical spring 32 normally urges the locking plate 29 to uppermost position wherein the notched end 31 of the locking plate 29 extends through the slot 28 and engages the locking groove 26 of the nose-piece 25 thereby to lock the weight 20 in its forward position in which it is substantially at the center-of-gravity of the aircraft.

Figures 4, 5:
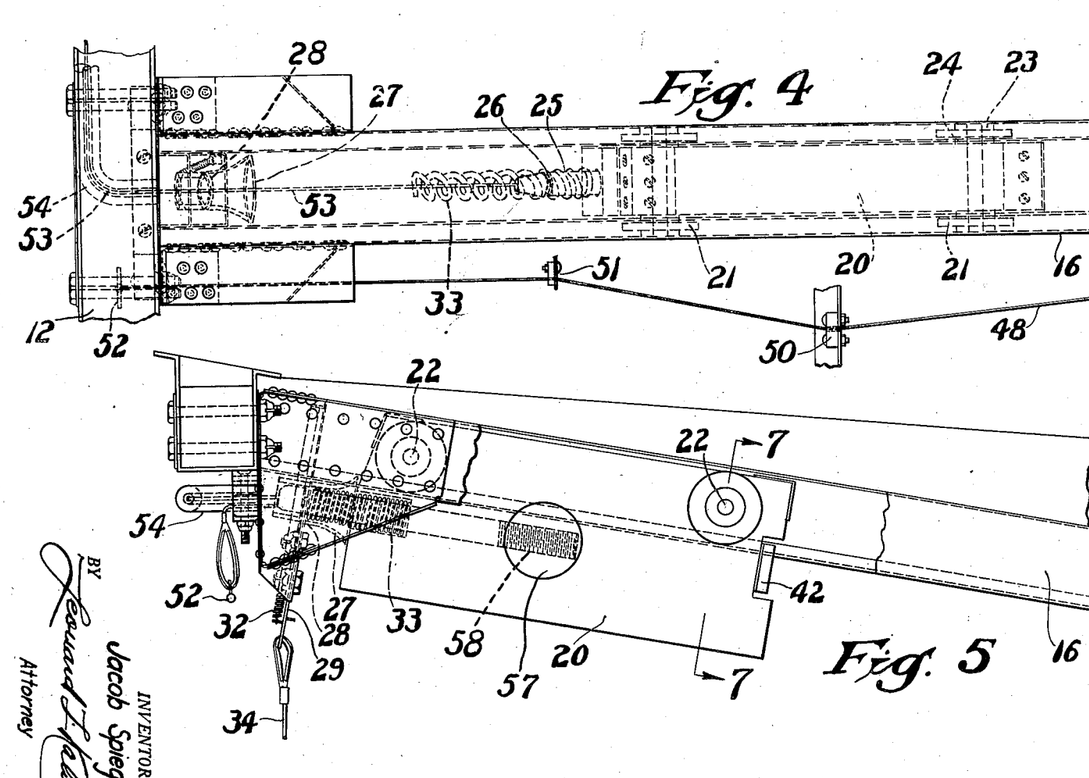
Figure 4 represents a top plan view, on an enlarged scale, of the forward end of the track; the weight being shown in released position.
Figure 5 represents a side elevational view of the forward end of the track showing the weight in locked position.

A coil spring 33 is fixedly mounted upon the nose-piece 25 and is compressed against the member 27 when the weight 20 is locked in its forwardmost position as shown in Figure 5.

Figures 2, 3:
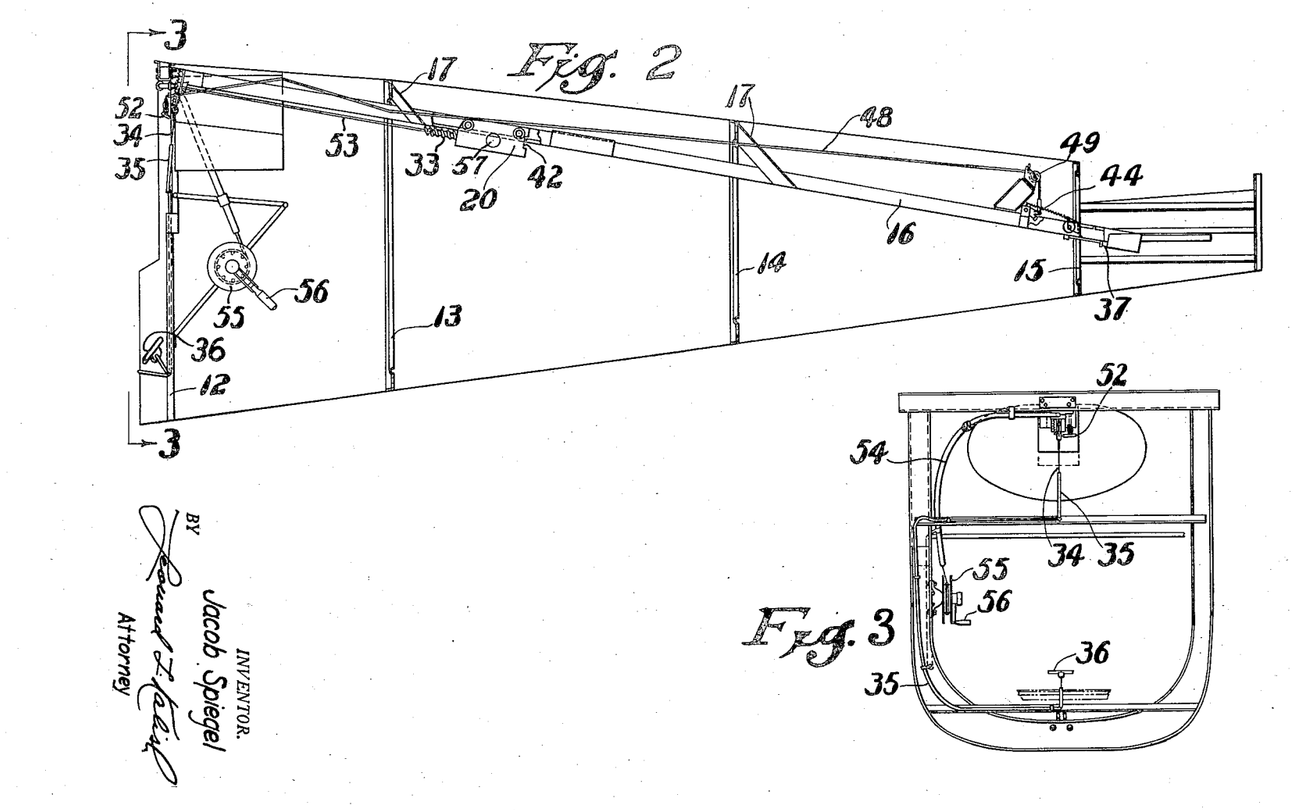
Figure 2 represents a side elevational view of the fuselage of Figure 1; the weight being shown in position intermediate the ends of the track.
Figure 3 represents a front elevational view of the fuselage, looking generally in the direction of the arrows 3—3 in Figure 2.

A release cable 34 extends downwardly from the locking plate 29 as shown in Figures 6 and 3 and through a conduit 35 extending to the bottom of the cockpit; a release handle 36 is provided at the end of the cable 34 as shown particularly in Figures 1 and 3. It is apparent that an upward pull upon the release handle 36 will draw the locking plate 29 downward against the tension of the spring 32 until the notched end 31 of said locking plate 29 disengages from the locking groove 26 of the nose-piece 25 whereupon the force of the compressed coil spring 33 will drive the weight 20 rearwardly with considerable force.

A shock absorber mechanism is provided at the lower rear end of the track 16. The shock absorber mechanism includes a cylinder 37 having a reduced vent-opening 38 in its rear.

A plunger 39 passes through the apertured front end of the cylinder 37 and carries a sealing gasket 40 at its inner end. A spring 41 is mounted within the cylinder 37 and bears against the gasket 40; the spring 41 urging the plunger 39 forwardly and outwardly to the position shown in solid lines in Figure 8.

Figure 8:
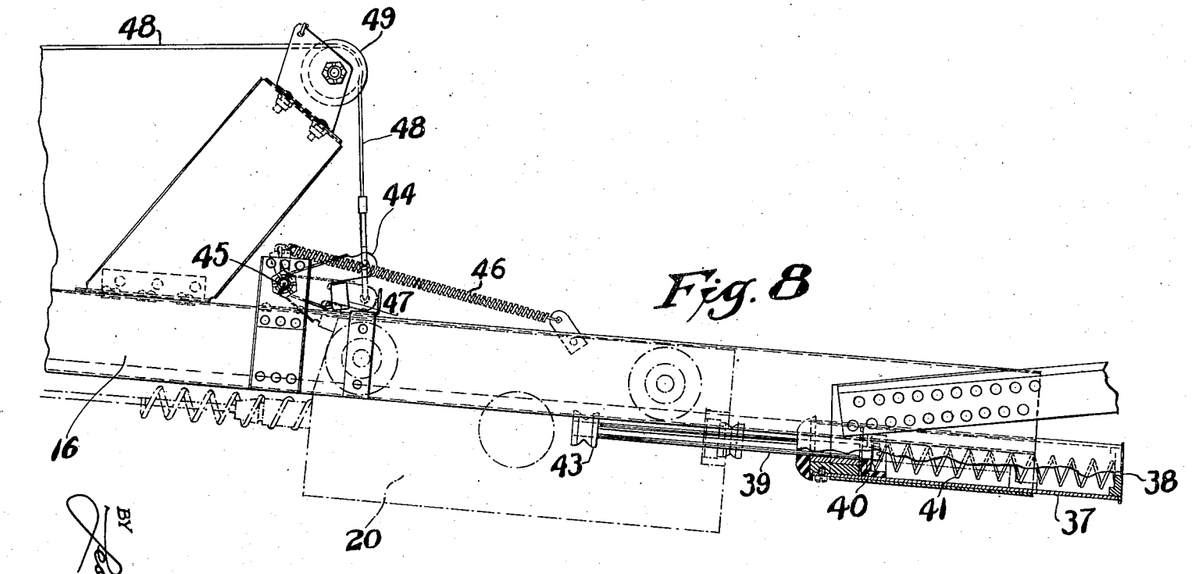
Figure 8 represents a side elevational view, on an enlarged scale, of the rear end of the track of Figures 1 and 2; showing the construction of the shock absorber and the safety catch forming part of the present invention.

A bumper 42 of rubber or the like is provided upon the rear end of the weight 20; the bumper 42 being adapted to contact the head 43 of the plunger 39 when the weight 20 is moved rearwardly, to the position shown in dash-dot lines in Figure 8.

It is apparent that, as the weight (moving with considerable speed under the influence of the spring 33) strikes the plunger 39, the plunger will be driven into the cylinder 37. Due to the pressure of the spring 41 and to the damping action of the reduced vent-opening 38, the plunger 39 will tend to resist the movement of the weight 20 and thereby to cushion the shock of the impact.

A safety catch 44 is mounted on the top of the track 16 somewhat forward of the cylinder 37.

The safety catch 44 is in the form of a bell crank pivotally mounted upon a pin 45 and normally urged to the clockwise-rotated locking position shown in dash-dot lines in Figure 8 by a spring 46. In this locking position, the shoulder 47 of the catch 44 extends through an opening in the top of the track 16 and engages the front edge of the weight 20 thereby preventing forward movement of the weight from its rearmost position as shown in dash-dot lines in Figure 8.

A release cable 48 extends from the safety catch 44 and over a pulley 49 from which it passes intermediate guides 50 and 51, terminating in a safety catch release handle 52 disposed in front of the front rib 12 and shown particularly in Figures 5 and 6.

A return cable 53 extends from the nose-piece 25 through the spring 33, the funnel-shaped member 27 and the socket 28 and through a conduit 54 from which it passes to a reel 55 provided with a handle 56.

The operation of the novel landing stabilizer of the present invention is as follows:

The weight 20 is normally carried in the forward position shown in Figures 1 and 5 in which, as previously stated, it is substantially at the center-of-gravity of the aircraft. The weight is kept in this forward position during take-offs and during normal flight.

During a landing operation (that is, either during the landing glide or after the wheels of the aircraft have touched the ground), the release handle 36 is pulled by the pilot to disengage the locking plate 29 from the nose-piece 25 whereupon the spring 33 drives the weight 20 violently rearwardly along the track 16. The weight 20 continues moving rearwardly until it strikes the plunger 39 and forces it into retracted position, the rear edge of the weight 20 forcing the shoulder 47 of the safety catch 44 upward against the tension of the spring 46 to permit the weight 20 to pass the safety catch 44. As soon as the front edge of the weight 20 clears the shoulder 47, the safety catch 44 is pulled back to locking position by the spring 46 thereby to prevent the weight 20 from bouncing or moving forward beyond said catch 44, as indicated in dash-dot lines in Figure 8.

In this rearmost position of the weight 20, the aircraft is tail-heavy which permits the elevators to be used as landing flaps as described above and which also permits the brakes to be applied without danger of nosing over.

After the landing has been completed and prior to the next take-off, the safety catch release handle 52 is pulled thereby to move the safety catch 44 to the counterclockwise-rotated nonlocking position shown in the solid lines in Figure 8 (against the tension of the spring 46) whereupon the plunger will move the weight 20 forward so that the front edge of the weight is beyond the shoulder 47 of the safety catch 44.

The weight 20 can then be returned to its forwardmost position by turning the handle 56 of the reel 55. The handle 56 is turned until the nose-piece 25 of the weight 20 enters the socket 28 (and in so doing depresses the locking plate 29 against the tension of the spring 32) whereupon the notched end 31 snaps back into engagement with the locking groove 26 of the nosepiece 25 so that the weight 20 is locked in its forwardmost center-of-gravity position ready for another landing.

The reel 55 is provided with any suitable clutch mechanism which permits the return cable 53 to unwind freely when the weight 20 is moved rearwardly by the spring 33.

While only a single weight and track are shown, it is within the scope of the present invention to provide two or three or more weights and tracks, if desired, so that one or more of the weights can be individually released at different times. Thus, for example, it is possible to provide three weights as described in my co-pending application Serial No. 438,375; one of the weights being intended to be released while the plane is still in the air to make the plane slightly tail-heavy and thereby to permit use of the elevators as landing flaps while the other weights are intended to be released after the wheels have contacted the ground thereby to make the plane more pronouncedly tail-heavy to permit sharp braking.

The track and associated parts can be constructed of light-weight metal, as, for example, aluminum alloy or the like so that the entire assembly weighs only a relatively few pounds, in addition to the weight 20 which can be of predetermined mass depending upon the particular aircraft in which it is installed.

The novel construction of the present invention provides a landing stabilizer which can quickly and easily be installed in the conventional fuselage of a standard aircraft without extensive changes in construction.

Moreover, my novel landing stabilizer can be inexpensively produced and functions efficiently and dependably to insure smooth, rapid and substantially shockless weight transfer from the normal flying position to the landing position.

I have found that the novel method of mounting my weight within the enclosed track prevents side-to-side swinging or wobbling or other undesirable oscillation of the weight during the period of transfer.

The novel spring mechanism of my construction insures rapid positive drive of the weight from the front end of the track to the rear and without having to depend upon the action of gravity for such transfer.

My novel shock absorbing-mechanism takes up the momentum of the weight and dampens the shock to the point where there is no appreciable stress imparted to the fuselage and, indeed, to the point at which there is no appreciable shock such as might be felt by the pilot.

When installed in a light two-passenger aircraft of conventional design, the weight 20 can weigh as little as ten or twelve pounds. Due to the fact that the weight is transferred almost to the rear end of the fuselage, when released from its forwardmost center-of-gravity position, a relatively great turning moment results tending to drop the tail of the aircraft. As stated hereinabove, this permits the elevators to be used as landing flaps without causing the aircraft to nose downward; the downward moment of the weight in the tail counteracting the upward moment generated by the depressed elevators and thus serving to keep the tail substantially in its original horizontal position.

At the same time, the mass of the weight 20 is so small compared to the mass of the aircraft that the center-of-gravity of the aircraft is not shifted appreciably rearwardly during the rearward transfer of the weight. That is, in a light aircraft of the type referred to hereinabove, employing a weight 20 of approximately ten to twelve pounds, the rearward transfer shifts the center-of-gravity of the aircraft rearwardly not more than an inch or so. Since the center-of-gravity of aircraft of this type is set by flying regulations as having a diameter of approximately eight inches, it is apparent that this rearward one inch shift still leaves the center-of-gravity of the aircraft well within the safety limits required.

Thus, it is possible considerably to shorten the landing run and to increase the angle of landing glide of the aircraft without appreciably affecting the fore-and-aft trim of the aircraft during flight.

The novel construction and arrangement of the safety catch mechanism and of the release and return mechanism of the present invention permit quick, easy and safe manipulation thereof. Thus, for example, the pilot can readily release the weight 20 from its forwardmost position by simply pulling the release handle 36 which is at the bottom of the cockpit. If, for any reason, the pilot changes his mind (after having released the weight 20) and desires not to land but, instead, to continue in level flight, he can simply pull safety catch release handle 52 and can then reach behind him into the fuselage and can turn the handle 56 of the reel 55 thereby to transfer the weight 20 to the forward end of the track; the rounded front end of the nose-piece 25 automatically moving the locking plate 29 downward against the tension of the spring 32 after which the plate 29 will spring back so that its notch 31 is in locking engagement with the groove 26 on the nose-piece 25.

It is obvious, therefore, that an entire cycle of operation (including the release of the weight from its forwardmost position, the release of the safety catch, and the return of the weight to its forwardmost locked position) can be completed in a matter of seconds if necessary.

As is evident particularly in Figure 1, the entire mechanism occupies only a relatively small portion of the fuselage space, permitting the rest of the fuselage to be used for fuel tanks, baggage, tool storage, etc.

In general, I have found that the weight 20 should preferably have a mass of about eight to twenty pounds, depending upon the size, weight and other dimensions of the aircraft upon which the landing stabilizer of the present invention is to be installed.

Having thus described my invention, what I claim as new and desire to protect by Letters Patent is:

1. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable latch means for locking said weight at the front end of said track, spring-means for automatically propelling said weight rearwardly along said track upon release of said latch means, a catch for automatically retaining said weight at the rear end of said track, pilot-operable means for releasing said catch, a return-cable fastened at one end to said weight, and pilot-operable reel-mechanism to which the other end of said return-cable is connected for returning said weight to the front end of said track and into engagement with said latch mechanism.

2. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable latch means for locking said weight at the front end of said track, spring-means for automatically propelling said weight rearwardly along said track upon release of said latch means, shock-absorbing mechanism operatively mounted at the rear end of said track for stopping said weight, a safety-catch mounted upon said track somewhat in front of said shock-absorbing mechanism and adapted automatically to retain said weight in rearmost position upon said track, a release-cable extending from said safety-catch to the cockpit of said aircraft and provided with a handle whereby said safety-catch can be released by the pilot, a return-cable connected at one end to said weight, and a pilot-operable reel to which the other end of said cable is connected for pulling said weight back to the front end of said track and into engagement with said latch-means.

3. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable latch means for locking said weight at the front end of said track, spring-means for automatically propelling said weight rearwardly along said track upon release of said latch means, shock-absorbing mechanism operatively mounted at the rear end of said track for stopping said weight, said shock-absorbing mechanism including a cylinder having a reduced vent opening at its rear end, a plunger slidably mounted within said cylinder and projecting from the front end thereof, and a spring disposed within said cylinder and normally urging said plunger to its outermost projecting position, a safety-catch mounted upon said track somewhat in front of said shock-absorbing mechanism and adapted automatically to retain said weight in rearmost position upon said track, a release-cable extending from said safety-catch to the cockpit of said aircraft and provided with a handle whereby said safety-catch can be released by the pilot, a return-cable connected at one end to said weight, and a pilot-operable reel to which the other end of said cable is connected for pulling said weight back to the front end of said track and into engagement with said latch-means.

4. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable means for locking said weight at the front end of said track, said locking means including a reduced nose-piece carried at the front end of said weight, said nose-piece having an annular locking groove formed thereon, a notched locking plate slidably mounted at the front end of said track and normally spring-urged into engagement with the locking groove of said nose-piece, and pilot-operable means for moving said locking plate out of engagement with said groove, spring means for automatically propelling said weight rearwardly along said track upon release thereof, and a pilot-releasable safety-catch operatively disposed adjacent the rear end of said track for automatically retaining said weight in rearmost position.

5. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable means for locking said weight at the front end of said track, said locking means including a reduced nose-piece carried at the front end of said weight, said nose-piece having an annular locking groove formed thereon, a funnel-shaped member mounted adjacent the front end of said track through which said nose-piece is adapted to extend, a notched locking plate slidably mounted in line with the slot of said funnel-shaped member and normally spring-urged within said slot and into locking engagement with the annular groove on said nose-piece, and pilot-operable means for moving said locking plate out of engagement with said groove, and a coil-spring mounted upon said nose-piece and adapted to be compressed against said funnel-shaped member when said weight is in forwardmost locked position, said coil-spring being adapted to drive said weight rearwardly along said track upon release of said locking means.

6. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable means for locking said weight at the front end of said track, said locking means including a reduced nose-piece carried at the front end of said weight, said nose-piece having an annular locking groove formed thereon, a slotted funnel-shaped member mounted adjacent the front end of said track into which said nose-piece is adapted to extend, a locking plate slidably mounted in line with the slot of said funnel-shaped member and normally spring-urged within said slot and into locking engagement with the annular groove on said nose-piece, and pilot-operable means for moving said locking plate out of engagement with said groove, a coil-spring mounted upon said nose-piece, and adapted to be compressed against said funnel-shaped member when said weight is in forwardmost locked position, said coil-spring being adapted to drive said weight rearwardly along said track upon release of said locking means, and a pilot-releasable safety-catch operatively disposed adjacent the rear end of said track for automatically retaining said weight in rearmost position.

7. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable means for locking said weight at the front end of said track, said locking means including a reduced nose-piece carried at the front end of said weight, said nose-piece having an annular locking groove formed thereon, a slotted funnel-shaped member mounted adjacent the front end of said track into which said nose-piece is adapted to extend, a notched locking plate slidably mounted in line with the slot of said funnel-shaped member and normally spring-urged within said slot and into locking engagement with the annular groove on said nose-piece, and pilot-operable means for moving said locking plate out of engagement with said groove, a coil-spring mounted upon said nose-piece and adapted to be compressed against said funnel-shaped member when said weight is in forwardmost locked position, said coil-spring being adapted to drive said weight rearwardly along said track upon release of said locking means, and a pilot-operable return-cable extending from said nose-piece through said coil-spring and said funnel-shaped member for returning said weight to its forwardmost locked position.

8. A landing stabilizer constructed and arranged to be mounted within the fuselage of a fixed-wing aircraft, said landing stabilizer comprising a track extending rearwardly within said fuselage from a point generally at the center-of-gravity of the aircraft, a weight movably mounted upon said track, pilot-releasable means for locking said weight at the front end of said track, said locking means including a reduced nose-piece carried at the front end of said weight, said nose-piece having an annular locking groove formed thereon, a slotted funnel-shaped member mounted adjacent the front end of said track into which said nose-piece is adapted to extend, a notched locking plate slidably mounted in line with the slot of said funnel-shaped member and normally spring-urged within said slot and into locking engagement with the annular groove on said nose-piece, and pilot-operable means for moving said locking plate out of engagement with said groove, a coil-spring mounted upon said nose-piece and adapted to be compressed against said funnel-shaped member when said weight is in forwardmost locked position, said coil-spring being adapted to drive said weight rearwardly along said track upon release of said locking means, a shock-absorber mounted at the rear end of said track, a pilot-releasable safety-catch operatively disposed upon said track slightly in front of said shock-absorber for automatically retaining said weight in rearmost position upon said track, a return-cable extending from said nose-piece through said coil-spring and said funnel-shaped member, and pilot-operable means for winding in said return cable thereby to return said weight to its forwardmost locked position.

9. In a fixed-wing aircraft having a fuselage extending rearwardly from said wing, a landing stabilizer comprising a track extending rearwardly within said fuselage from a point generally at the center-of-gravity of the aircraft, a weight movably mounted upon said track, said weight being constructed in most part of lead and having an insert of relatively harder metal, pilot-releasable means for locking said weight at the front end of said track, said locking means including a reduced nose-piece screw-threadedly fastened to said insert and protruding from the forward end of said weight, said nose-piece having a rounded front end and having an annular locking groove formed on its protruding portion, a notched locking plate slidably mounted adjacent the front end of said track and normally spring-urged into locking engagement with the groove on said nose-piece, pilot-operable means for moving said locking plate out of engagement with said groove, a spring operatively connected to said weight and adapted to drive said weight rearwardly along said track upon release of said locking means, and means for automatically retaining said weight at the rear end of said track.

10. In a fixed-wing aircraft having a fuselage extending rearwardly from said wing, a landing stabilizer comprising a track extending rearwardly within said fuselage from a point generally at the center-of-gravity of the aircraft, a weight movably mounted upon said track, said weight being constructed in most part of lead and having an insert of relatively harder metal, pilot-releasable means for locking said weight at the front end of said track, said locking means including a reduced nose-piece screw-threadedly fastened to said insert and protruding from the forward end of said weight, said nose-piece having a rounded front end and having an annular locking groove formed on its protruding portion, a notched locking plate slidably mounted adjacent the front end of said track and normally spring-urged into locking engagement with the groove on said nose-piece, pilot-operable means for moving said locking plate out of engagement with said groove, a spring operatively connected to said weight and adapted to drive said weight rearwardly along said track upon release of said locking means, a pilot-releasable safety catch for automatically retaining said weight at the rear end of said track, and pilot-operable means for returning said weight to its forwardmost locked position.

JACOB SPIEGEL.

REFERENCES CITED

The following references are of record in the file of this patent:

UNITED STATES PATENTS

| Number | Name | Date |
| --- | --- | --- |
| 1,449,476 | Whipps | Mar. 27, 1923 |
| 1,710,225 | Kennedy | Apr. 23, 1929 |
| 1,713,450 | Ruhl et al. | May 14, 1929 |
| 1,765,195 | Ax | June 17, 1930 |
| 2,385,850 | Spiegel | Oct. 2, 1945 |